United States Patent
Wong

(10) Patent No.: US 6,307,000 B1
(45) Date of Patent: Oct. 23, 2001

(54) MULTIFUNCTIONAL NONIONIC SILOXANE COPOLYMER FOR MODIFICATION OF SYNTHETIC MATERIALS

(76) Inventor: Patrick T. T. Wong, 35 MacNabb Pl., Ottawa, Ontario (CA), K1L 8J5

( * ) Notice: Subject to any disclaimer, the term of this patent is extended or adjusted under 35 U.S.C. 154(b) by 0 days.

(21) Appl. No.: 09/335,765

(22) Filed: Jun. 18, 1999

(51) Int. Cl.$^7$ .......................... G08G 77/04; D06M 13/51
(52) U.S. Cl. ................. 528/25; 528/26; 528/28; 528/29; 528/31; 528/33; 528/38; 528/41; 8/115.51; 8/115.6; 8/DIG. 1; 252/8.61; 252/8.63; 252/FOR 100
(58) Field of Search .................. 528/25, 26, 28, 528/29, 31, 33, 38, 41; 8/115.51, 115.6, DIG. 1; 252/8.61, 8.63, FOR 100

(56) References Cited

U.S. PATENT DOCUMENTS

| | | |
|---|---|---|
| 3,097,185 | 7/1963 | Armen et al. . |
| 3,099,631 | 7/1963 | Tanner . |
| 3,252,880 | 5/1966 | Magat et al. . |
| 3,297,786 | 1/1967 | Horowitz . |
| 3,338,943 * | 8/1967 | Speier . |
| 4,135,877 | 1/1979 | Aikawa et al. . |
| 4,359,545 * | 11/1982 | Ona et al. ............................. 524/262 |
| 4,409,267 * | 10/1983 | Ichinohe et al. ..................... 427/387 |
| 4,427,815 * | 1/1984 | Ona et al. ............................. 524/315 |
| 4,459,382 * | 7/1984 | Ona et al. ............................. 524/860 |
| 4,587,320 * | 5/1986 | Swihart ................................ 528/23 |
| 4,761,445 | 8/1988 | Chiba . |
| 5,132,392 | 7/1992 | DeYoung et al. . |
| 5,252,233 * | 10/1993 | Czech ................................... 252/8.6 |
| 5,354,815 | 10/1994 | Barringer, Jr.et al. . |
| 5,395,955 | 3/1995 | Okawa et al. . |
| 5,408,012 | 4/1995 | Barringer, Jr. . |
| 5,527,855 | 6/1996 | Petroff et al. . |
| 5,891,977 * | 4/1999 | Dietz et al. ........................... 528/15 |

FOREIGN PATENT DOCUMENTS 1 301 074  12/1972 (GB) .

OTHER PUBLICATIONS

Chemical Abstract No. 128:140939, "Synthesis of Aldonamide Siloxanes by Hydrosilylation".
Chemical Abstract No. 120:57224, "Organosiloxanes Having Sugar Residues and Manufacture Thereof".
Chemical Abstract No. 131:170720, "Synthesis and Structural Characterization of Novel Multifunctional Polysiloxanes Having Photo–Refractive Properties".

* cited by examiner

Primary Examiner—Robert Dawson
Assistant Examiner—Jeffrey B. Robertson
(74) Attorney, Agent, or Firm—Pillsbury Winthrop LLP

(57) ABSTRACT

A multifunctional nonionic or partially nonionic siloxane copolymer for modification of synthetic materials and methods for modifying synthetic materials with the siloxane copolymer are provided. Synthetic materials modified with the siloxane copolymer, and fabrics made from the modified synthetic materials, have improved hydrophilicity, thermal regulative properties, and simultaneously improved softening effects and hand.

9 Claims, No Drawings

US 6,307,000 B1

MULTIFUNCTIONAL NONIONIC SILOXANE COPOLYMER FOR MODIFICATION OF SYNTHETIC MATERIALS

BACKGROUND OF THE INVENTION

1. Field of the Invention

This invention relates to multifunctional nonionic and partially nonionic siloxane copolymers for binding to and modification of synthetic materials. More particularly, in the present invention the multifunctional nonionic and partially nonionic siloxane copolymers are durably bound to polyamide and polyester materials to simultaneously soften and enhance the hydrophilicity and thermal regulative properties of a fabric made from the synthetic materials. No polymerization between the siloxane copolymer and the synthetic materials takes place in the modification process.

2. Description of the Related Art

Many synthetic materials such as those formulated from polyamide and/or polyester polymers have undesirable hydrophobic character and thermal regulative properties. Thermal regulative properties include such properties as moisture absorption and releasing properties. Past approaches to modify those properties have involved graft polymerization of hydrophilic monomers with the polyamide or polyester polymer, or coating the polyamide or polyester fabrics with an appropriate hydrophilic agent.

Graft polymerization of hydrophilic monomers onto a substrate comprising a polyamide or polyester polymer has been disfavored since such a process can change the molecular structure of the polyamide or polyester polymer dramatically. These changes in molecular structure can result in the loss of desirable physical properties such as fabric strength, thermal regulative properties, and hand. Such graft polymerization techniques are disclosed in U.S. Pat. No. 4,135,877 to Aikawa et al.; U.S. Pat. No. 3,297,786 to Horowitz; U.S. Pat. No. 3,099,631 to Tanner; U.S. Pat. No. 3,252,880 to Magat et al.; and U.S. Pat. No. 3,097,185 to Armen.

Likewise, coating fabrics with hydrophilic agents is not widely accepted because of the poor longevity of the coating when exposed to normal laundering techniques.

Another approach to modify synthetic materials is binding an anionic hydrophilic polysiloxane, to the polyamide or polyester polymer. The binding of the polysiloxane to the polymer is reported to be achieved through both electrostatic and intermolecular hydrogen bonding via anionic groups on the polysiloxane. There is little or no polymerization of the polysiloxane with the polyamide or polyester polymer. The hydrophilicity of the polysiloxane is derived from the anionic binding groups as well as the presence of hydroxyl, alkoxyl and primary hydroxylate groups. See U.S. Pat. Nos. 5,354,815 and 5,408,012 to Barringer, Jr., et al. and Barringer, Jr., respectively.

For the anionic hydrophilic polysiloxanes described in the above-cited Barringer patents, the anionic nature of the binding moieties in the polysiloxane and the electric repulsive nature of the carbonyl groups in the polyester greatly lowers the binding affinity to polyester polymers.

Additionally the hydrophilic alkoxyl groups in the polysiloxane backbone of the Barringer agents, Si—OR groups, can be easily hydrolyzed to reactive Si—OH groups. Neighboring Si—OH groups can then undergo condensation reactions which, in turn, decrease the hydrophilicity and the polysiloxane molecules of the disclosed agents precipitate from the solution before contacting the fabrics to be treated due to the condensation reaction.

The anionic nature of the Barringer agents also prevent the simultaneous treatment of polymer materials with other cationic additives and auxiliaries such as softeners, dispersing agents, wetting surfactants, leveling agents, UV absorbing agents, IR absorbing agents, antistatic agents, antifoaming agents, fluorescent brightening agents, bacteriostats, fungistats and the like. Moreover, hard water with significant amounts of metal cations must be avoided in the process of treating fabrics with the Barringer agents.

Commonly polysiloxanes provide softening effects and improve hand on the fabrics made of synthetic materials. However, in the Barringer agents most of the functional groups in the polysiloxane backbone are replaced by various anionic acid groups. Consequently, the softening effects of the Barringer agents are reduced to a minimum and an additional softening treatment is required to improve hand after the treatment of the Barringer polysiloxanes.

Thus, it would be a significant advancement in the art to provide a multifunctional nonionic or partially nonionic siloxane copolymer for modification of synthetic materials with binding strength to the synthetic materials. These modified synthetic materials could then be made into a synthetic fabric with more durable enhanced hydrophilicity and thermal regulative properties as well as improved softening effects and hand. Additionally the multifunctional siloxane copolymers could also be used to treat synthetic fabrics directly. The siloxane copolymer can be applied simultaneously with dyeing of the synthetic material or separately.

SUMMARY OF THE INVENTION

It is an object of the present invention to provide multifunctional nonionic and partially nonionic siloxane copolymers that have binding ability to synthetic materials. The synthetic materials modified with the multifunctional siloxane copolymers of the present invention can be made into synthetic fabrics. The synthetic fabrics can have enhanced hydrophilicity and thermal regulative properties as well as improved softening effects and hand over untreated synthetic fabrics.

This invention relates to a nonionic or partially nonionic multifunctional siloxane copolymer for modifying synthetic materials with increased and more durable binding to synthetic materials. The modified synthetic materials can be manufactured into synthetic fabrics which exhibit increased modification longevity, increased hydrophilicity, enhanced softening effects, more desirable hand, and more resistance to yellowing from the amino functional groups. Examples of synthetic materials that may be modified with the multifunctional siloxane copolymers of the present invention include polyamides and polyesters.

Also provided by the present invention are various processes for modifying synthetic materials to provide the desired increased hydrophilicity, enhanced softening effects and more desirable hand to a synthetic fabric made from the modified synthetic materials.

One aspect of the modification process comprises contacting a synthetic fabric with a solution of the siloxane copolymer. Another method is to incorporate the siloxane copolymer and the synthetic material prior to forming the synthetic material into either yarn, filament, fiber, or fabric. The siloxane copolymer can be applied either simultaneously or separately with dyeing of the synthetic material.

Another object of the present invention is to provide a synthetic material containing the multifunctional siloxane copolymer. The synthetic material may be in the form of a yarn, filament, fiber, or fabric, or may be unprocessed synthetic material.

Another object of the present invention is to provide a synthetic fabric containing the multifunctional siloxane copolymer. The synthetic fabric can have increased modification longevity, increased hydrophilicity, enhanced softening effects, more desirable hand, and more resistance to yellowing.

DETAILED DESCRIPTION OF THE INVENTION

A multifunctional nonionic or partially nonionic siloxane copolymer according to the present invention can be represented by the following general compositional formula:

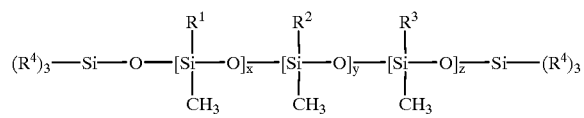

wherein $R^1$ comprises at least one member from among hydrogen, nonionic carbohydrates, nonionic carbinols, nonionic primary and secondary amines, alkylureas, and anionic functional groups, $R^2$ comprises at least one member from among hydrogen, alcohols, carboxylic acids, epoxyalkyl groups, polyalkeneoxide carbinols, anionic carbinols, nonionic carbohydrates, and anionic carbohydrates, $R^3$ comprises at least one member from among alkyl groups, phenyl groups and alkoxyl groups, and each $R^4$ independently comprises an alkyl group, phenyl group, alkoxyl group, $R^1$ or $R^2$ group. In the general formula above, the $R^1$, $R^2$, $R^3$ and $R^4$ moieties can be the same or different independently of one another. The ratio between the x, y, and z factors can be adjusted for the desired physical properties of the modified materials.

Furthermore, $R^1$ and $R^2$ are independently hydrophilic functional groups with binding ability to either or both the amide group of a polyamide and the carbonyl group of a polyester. The $R^4$ alkyl group preferably refers to a lower alkyl group, inclusive of straight and branched $C_1$–$C_4$ alkyls. $R^4$ includes, for instance, methyl, ethyl, propyl, iso-propyl, n-butyl, sec-butyl, and t-butyl. $R^4$ is preferably methyl.

The above general formula only indicates the composition and the presence of three types of monomers in the copolymer but not the position sequence of the three monomers in the copolymer. In the copolymer, the positions of the monomers containing $R^1$, $R^2$ and $R^3$ functional groups can be random and their molar amounts in the copolymer are represented by x, y, and z. The molar ratio x:y:z is adjusted to achieve the desired binding ability, hydrophilicity, solubility in water and softening effects in a synthetic fabric made from a treated synthetic material or in a treated synthetic fabric. The selection of the $R^3$ group is based on the melting point and thermostability requirements for the multifunctional siloxane copolymer.

The multifunctional nonionic and partially nonionic siloxane copolymer can be synthesized by copolymerization of predetermined amounts of the three individual monomers. A suitable starting compound for the multifunctional nonionic siloxane copolymer can provide a polysiloxane backbone, to which the various $R^1$ and $R^2$ groups are attached, as desired, to obtain the final multifunctional siloxane copolymer. One preferred starting material is polymethylhydrodimethylsiloxane:

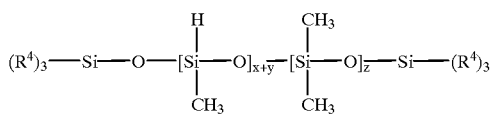

where each $R^4$ is preferably methyl, and x, y, z are as set forth above. The starting material and x:y:z ratio vary according to the desired properties of the multifunctional siloxane copolymer. The molar amount, z, of the dimethylsilane unit, $Si(CH_3)_2O$, can be equal to or approximately equal to the sum of x and y.

The multifunctional siloxane copolymers of the present invention typically have a molecular weight greater than about 1,000 g/mol, preferably greater than about 2,000 g/mol, and most preferably greater than about 4,000 g/mol. The siloxane copolymers of the present invention are preferably soluble or miscible with water.

Synthetic materials which may be modified with the multifunctional siloxane copolymers of the present invention include, for example, polyamides, polyesters and other carbonyl containing polymers. Polyamides further include, for example, nylon-6 (polycaprolactam), nylon-6,6 (polyhexamethylene/adipic acid amide), nylon-6, 10 (polyhexamethylene/sebacic acid amide) and the like. Polyesters include, for example, highly polymeric linear polyesters, linear polyesters of aromatic dicarboxylic acids and dihydric compounds such as polyethylene terephthalate, modified polyesters and copolymers and the like.

The synthetic materials can be in various textile forms, for example, fiber, web, yarn, skeins, woven fabric, non-woven fabric, or knitted fabric. Synthetic fabrics as used herein refers to synthetic materials fabricated into, for example, the various textile forms listed above. The synthetic materials and fabrics can be impregnated, coated, or otherwise contacted with the multifunctional siloxane copolymer, for example, suspended in an aqueous solution containing the siloxane copolymer. The siloxane copolymer can be fixed to the textile form in a batch process or any suitable continuous or semi-continuous process using conventional processing equipment. The siloxane copolymer and the synthetic materials can also be melt processed together to form a raw synthetic material which can be further processed into a suitable textile form. The synthetic materials can be the sole component of the textile form or blended with other synthetic materials or with other materials such as cotton, silk, or wool.

When synthetic materials are modified in the melting process, synthetic materials that can be modified by the multifunctional siloxane copolymers of the present invention are not limited to those containing carbonyl, amide or amino moieties. In this process, any synthetic materials including those without carbonyl, amide or amino moieties, such as polyethylene and polypropylene, can be modified by the siloxane copolymers of the present invention. Moreover, the siloxane copolymer of the present invention can be used to treat natural fiber and fabrics such as those of silk, wool, cellulose and the like, since the functional groups in these natural fibers can also form a strong hydrogen bond with the nonionic or partially nonionic siloxane copolymer of the present invention.

The R groups ($R^1$, $R^2$ $R^3$ and $R^4$) as used herein represent a specified moiety prior to attaching to the polysiloxane backbone, recognizing that upon reaction to attach to the backbone, hydrogen atoms, for instance, will be replaced by that moiety.

The $R^1$ group includes, for example, hydrogen, nonionic carbohydrates, nonionic carbinols, nonionic primary and secondary amines, and alkylureas. Nonionic carbohydrates include carbohydrates such as monosaccharides, modified monosaccharides, low molecular weight polysaccharides. Low molecular weight polysaccharides refers to polysaccharides with molecular weights not higher than about 1,000 g/mole, preferably less than 400 g/mole. If no cationic additives and auxiliaries are used during the treatment of the present siloxane copolymer, $R^1$ may also include anionic functional groups provided that $R^2$ is a nonionic functional group that exhibits binding ability to the carbonyl groups of polyester. When $R^1$ is an anionic functional group which exhibits no binding ability to polyester, the total binding ability of the siloxane copolymer to polyester is reduced. In this case, alkoxyl groups, Si—OR, are preferred for the $R^3$ moiety of the siloxane copolymer. After the siloxane copolymer molecules are dispersed into polyester fiber, the Si—OR groups are hydrolyzed into Si—OH under acidic conditions. In the drying process, a $H_2O$ molecule will be removed from a pair of Si—OH groups of the neighboring copolymer molecules and form a stable Si—O—Si bond. This stable Si—O—Si bond increases the water fastness of the copolymer in polyester and compensate for any loss of water fastness due to the anionic nature of the $R^1$ moieties.

Suitable nonionic $R^1$ groups include, for instance, —$(CH_2)_2$-α-galactose, —$(CH_2)_3$—$NH_2$, —$(CH_2)_3$—NH—C(O)-glucose, —$(CH_2)_3$—OH, —$(CH_2)_3$—N(H)—C(O)—$NH_2$, —$(CH_2)_3$—O—$(CH_2CH_2O)_n$—H, wherein n is between about 6 and about 50, and —$(CH_2)_3$—$C_6H_4$—OH.

Suitable anionic groups include, for example, sulfonate, sulfate, phosphonate, phosphate, carboxylate and all the above nonionic functional groups containing these anionic groups. These anionic groups bind effectively to the amino end groups of polyamide materials.

The hydrophilic carbohydrate groups are very stable, and, significantly, the —$CH_2OH$ group in the carbohydrate group can bind both the carbonyl group in the polyester and the amide group in the polyamide. Thus the carbohydrate containing polysiloxane can strongly bind both polyamides and polyesters.

Nonionic carbinols, with terminal hydroxyl groups, bind strongly to the carbonyl groups in the polyamide and polyester materials. Exemplary nonionic carbinols include primary alcohols and polyalkene oxide carbinols. Particularly preferred are nonionic carbinols with increased hydrophilic character, such as nonionic carbinols with, for instance, polyethylene oxide moieties incorporated therein.

Amino-modified polysiloxanes are known to provide synthetic fabrics with unique hand, body, and silky effects. Unfortunately, oxidation of the amino moiety results in yellowing of a treated fabric over time. One approach to minimize the yellowing has been to substitute alkyl or alkoxyl groups in place of the reactive hydrogen atoms in the amino group.

In one of its embodiments, the present invention provides for a retardation in yellowing effects by substituting the above-described carbohydrate groups or carbinol groups in place of the reactive hydrogen atoms of the amino groups. This substitution will not only retard the yellowing effect but also enhance the hydrophilicity and reduce the electrostatic nature of the treated fabric as compared to conventional amino-modified polysiloxane treated synthetic fabrics.

The presence of the carbohydrate or carbinol groups on the amino-modified polysiloxane, however, provides insufficient hydrophilicity and water solubility. This effect can be compensated for by having additional hydrophilic groups attached to the polysiloxane backbone as $R^2$ groups, for instance.

The $R^2$ groups include, for example, primary alcohols, carboxylic acids, epoxyalkyl groups, polyalkeneoxide carbinols, anionic carbinols, nonionic carbohydrates, ethylene urea and anionic carbohydrates. Specific examples of $R^2$ groups include —$(CH_2)_2$—$NHCONH_2$, —$(CH_2)_2$—(α-galactose), —$(CH_2)_3$—O—$(CH_2CH_2O)_n$—H and —$(CH_2)_3COOH$.

The hydrophilic functional $R^1$ and $R^2$ groups are preferably attached to the polysiloxane backbone by a Si—C bond linkage rather than a Si—O linkage. The nature of the attachment of the functional group to the polysiloxane backbone is important in achieving a long lasting and durable material modification. The Si—O bond is relatively weak against hydrolysis and preferably should be avoided in order to produce a stable modified synthetic material. In order to increase the longevity of the multifunctional siloxane copolymers the more stable Si—C bond linkage is utilized in a preferred embodiment of the present invention. The durability of the attachment of the siloxane copolymers to the synthetic material is increased due to the Si—C bond linkage.

One method of attaching the $R^1$ and $R^2$ groups to the polysiloxane backbone with the Si—C linkage is to first allylate the $R^1$ or $R^2$ group and then add the allylated $R^1$ or $R^2$ group to the polysiloxane backbone via a catalyzed addition reaction at a temperature sufficient to drive the reaction to completion in a timely fashion. A suitable catalyst includes precious or noble metal catalysts, such as platinum or palladium. A suitable temperature is generally above about 60° C., such as, for instance, in the range of approximately 60° to 100° C. A specific example of a suitable catalyst is, for instance, a platinum divinyltetramethyldisiloxane complex available from United Chemical Technologies, Inc., Bristol, Pa.

During the allylation, addition, and oxidation process steps, the reactive hydrogen atoms in the functional $R^1$ and $R^2$ groups must be protected with protective groups. Suitable protective groups can be selected from those disclosed in "Protective Groups in Organic Synthesis," by T. W. Greene and P. G. M. Wuts, Wiley & Sons (1991), the complete disclosure of which is hereby incorporated by reference. Some suitable protective groups include, for instance, acetyl group and trimethylsilyl group, among others. Removal of the protective groups when no longer needed can also be effected as disclosed in the Greene et al. reference.

One suitable process for making the multifunctional siloxane copolymer can include, for example, the steps of adding protective groups to first and second functional group containing moieties, allylating the first and second functional group containing moieties to obtain first and second allylated functional group containing moieties, respectively. The first allylated functional group containing moiety can be attached to a polysiloxane backbone moiety to obtain a polysiloxane backbone moiety containing a first functional group. To the polysiloxane backbone moiety containing a first functional group, the second allylated functional group containing moiety can be attached to obtain a polysiloxane backbone moiety containing first and second functional groups. The protective groups can be removed to obtain a multifunctional siloxane copolymer which can then be isolated and purified.

Amino-modified siloxane copolymers according to the present invention can be prepared in a variety of ways using known reaction conditions. One preferred method is to allylate a primary amine, and then attach it to the polysiloxane backbone by a catalyzed condensation reaction. The amino-modified siloxane copolymer is then coupled to a nonionic carbohydrate or carbinol group which has also undergone both allylation followed by oxidation to carboxylic acid groups. The carboxylic acid group couples with the amino group with a coupling agent such as 1-ethyl-3-(3-dimethylaminopropyl)carbodiimide to form a strong amide linkage.

The amino groups of the amino-modified siloxane copolymer can be coupled directly with lactones without the use of a coupling agent.

Alternative methods of preparing the amino-modified siloxane copolymers include first reacting an allylated amino group with a carboxylic acidified carbohydrate or carbinol to form an adduct which is then linked to the polysiloxane backbone by addition reaction.

$R^1$, $R^2$ and $R^3$ are independently selected. They are severally selected to maximize the binding ability of the siloxane copolymers to the synthetic material and also to obtain the desired level of hydrophilicity, thermal regulative properties, softening effects, improved hand and other physical properties such as antistatic and antifoaming properties in the final synthetic fabric produced from the synthetic material. Based on the properties of a given $R^1$ group one of ordinary skill can readily select a corresponding $R^2$ group to achieve the desired effects.

For instance, when $R^1$ is a primary or a secondary amino functional group, the resulting modified polysiloxane provides excellent softening effects and hand. However, the hydrophilicity and water solubility of a modified polysiloxane with only primary or secondary amino functional groups would be typically less than desired. Therefore, a carbinol such as a polyethyleneoxide carbinol, primary alcohol or carboxylic acid is utilized as $R^2$ to thereby improve the hydrophilicity and water solubility of the siloxane copolymer.

Likewise when $R^1$ is an anionic functional group, which can bind only the amide groups and amino end groups of polyamides, then in order for the siloxane copolymer to also bind to polyesters, the $R^2$ groups are preferably selected from among nonionic carbohydrates and nonionic carbinols.

Conversely when $R^1$ is a nonionic carbohydrate or carbinol which can bind to both polyamide and polyester synthetic materials, then anionic functional groups can be selected as the $R^2$ group to achieve enhanced binding to polyamide materials.

For modifying textile forms of synthetic materials, an aqueous treatment solution containing about 0.1 to 10 wt. % of the siloxane copolymer according to the present invention, preferably from about 0.2 to about 5 wt. %, and most preferably about 1 wt. %, can be prepared. The solution can be applied to the textile form in a variety of ways including, for example, immersion of the textile form in the solution, brushing the solution onto the textile form, and passing the textile form through a bath of the solution at a temperature of about 80 to 100° C. The aqueous treatment solution contains dispersing agents, such as, for example, diphenyl, o-phenylphenol, aromatic sulfonate/formaldehyde condensates, polycarboxylates and phosphates of alcohols and alkoxylated alcohols.

In the absence of dispersing agent, the treatment solution will be maintained at about 120° to 130° C.

The treated textile form can be dried at a temperature of about 100° to 180° C. until dried, usually about 3–10 minutes. Drying times can vary significantly depending on the form of the textile being treated. The preferred application level of the multifunctional siloxane copolymer to the finished textile is from about 1 to about 5 wt. % based on the total weight of the textile.

Other additives and agents can be added to the treated synthetic textile, such as, UV absorbing agents, IR absorbing agents, antistatic agents, antifoaming agents, oil-repellent agents, fluorescent brightening agents, bacteriostats, and fungistats. Treatment with any one or more of these exemplary additives and agents can be effected as part of a post-treatment finish following the treatment of the synthetic material substrate with the multifunctional siloxane copolymer of the present invention.

The following examples are presented to provide a more complete understanding of the invention The specific techniques, conditions, materials, and reported data set forth to illustrate the principles of the invention are exemplary and should not be construed as limiting the scope of the invention.

EXPERIMENTAL METHODS

FT-IR was used to follow the progress of the addition of $R^1$ and $R^2$ groups to the siloxane starting material by monitoring the disappearance of the absorption band at 2250–2100 cm$^{-1}$ or 950–800 cm$^{-1}$ attributed to the Si—H moiety in the starting material.

Other techniques such as NMR, mass spectroscopy and TLC were also used to monitor the addition reaction, synthesis, allylation, and oxidation of the functional group molecules, $R^1$ and $R^2$, and protection and removal of the protection of the reactive hydrogen atoms of the functional group molecules, $R^1$ and $R^2$.

The properties of the fabrics were tested by measuring the wetting time and the wicking time. Wetting time is defined as the time required for a water droplet placed on the surface of a horizontally positioned sample of fabric to disappear as determined by light reflection from the water droplet. Wicking time is defined as the time required for a one inch vertical migration of water on a vertically positioned sample of fabric from the water/fabric contact surface.

EXAMPLES

Example 1

Preparation of Siloxane Copolymer No. 1

A 25 mL double neck glass vessel was charged with a mixture of 1 gram of polymethylhydrodimethylsiloxane (United Chemical Technologies, Inc., Bristol, Pa.) and 10 mL of toluene to which was added 2.4 gram of allylated α-galactose acetate (α-galactose from Aldrich, Milwaukee, Wis.). The mixture was flushed with nitrogen, heated to a temperature of approximately 60° C. to 85° C. and 0.022 mL of 0.2% solution of platinum divinyltetramethyldisiloxane (United Chemical Technologies, Inc., Bristol, Pa.) was added drop wise with a syringe. The reaction mixture was stirred until all the α-galactose acetate molecules were attached to the polysiloxane backbone as monitored by TLC. Then, 1 gram of allyl-monotrimethylsiloxy terminated polyethylene oxide carbinol (Gelest, Inc. Tullytown, Pa.) was added to the reaction mixture in the vessel and an additional 0.022 mL of the 0.2% platinum catalyst solution was added to the reaction mixture drop wise. The reaction was continued until the IR absorption band at 2160 cm$^{-1}$ disappeared.

Prior to allylation the reactive hydrogen atoms of α-galactose were protected by protective groups. In the case of α-galactose, acetyl group was used as the protective group, and trimethylsiloxyl group was used to protect the reactive hydrogen atoms of polyethylene oxide carbinol.

Allylation of α-galactose acetate was carried out by allyltrimethylsilane with boron trifluoride etherate. Purification of the mixed fractions was performed on a hexane packed bed of silica gel, using 2:1 hexane/ethylacetate as the eluating solvent.

The protective groups were removed after addition of the —$CH_2$=$CH_2$-(α-galactose acetate) and —$CH_2$=$CH_2CH_2O(CH_2CH_2O)_nSi(CH_3)_3$ to the polysiloxane backbone was completed. The removal of the protective groups was accomplished by hydrolysis at a pH of 8–9 with $NaOCH_3$ in methanol.

The solvent was removed from the final product by evaporation. The final product was purified by dialysis. The siloxane copolymer thus obtained is nonionic.

The approximate molar ratio for the α-galactosemethylsilane monomer, the carbinomethylsilane monomer and dimethylsilane monomer in the final product is 3.3:1:4.3, as determined by the amounts of various raw materials in the reaction.

Example 2

Preparation of Siloxane Copolymer No. 2

In the siloxane copolymer No. 2, $R^1$ is —$(CH_2)_3$—N(H)—C(O)-glucose, $R^2$ is —$(CH_2)_3$—O—$(CH_2CH_2O)_n$—H, $R^3$ is —$CH_3$ and the resulting siloxane copolymer is nonionic. $R^2$ was first attached to the polysiloxane backbone in polymethylhydrodimethylsiloxane by the same procedure described previously in Example 1. Prior to allylation the reactive hydrogen atom on $R^2$ was protected by a trimethylsilane group. Then, the protected allylamine, allylaminotrimethylsilane (Aldrich, Milwaukee, Wis.), was attached to the polysiloxane backbone by addition reaction with platinum catalyst. After the protective group, trimethylsilane, was removed from the amino group at pH 8–9 in ethyl alcohol solution, D-glucono-1,5-lactone (Pfanstiehl Laboratories, Inc., Woukegan, Ill.) was added into the solution and the temperature was raised to 50° C. for 1 hour until the amino groups were completely bound to the lactone molecules as monitored by the Kayser test for free amino groups.

The approximate molar ratio for the $R^1$ methylsiloxane monomer, $R^2$ methylsiloxane monomer and $R^3$ methylsiloxane monomer is 3.3:1:4.3.

Example 3

Preparation of Siloxane Copolymer No. 3

In the siloxane copolymer No. 3, $R^1$ is —$(CH_2)_3$—$NHCONH_2$, $R^2$ is —$(CH_2)_3$—O—$(CH_2CH_2O)_n$—H, $R^3$ is $CH_3$ and the resulting siloxane copolymer is nonionic. Allylated polyethylene oxide carbinol and allylated urea were attached to the polysiloxane backbone in polymethylhydrodimethylsiloxane by the addition reaction procedure as described in the preparation procedure of Example 1. The protection of the hydrogen atoms of the urea is not required in the addition reaction. Prior to allylation the reactive hydrogen atom on $R^1$ was protected by trimethylsilane group.

The approximate molar ratio for the $R^1$ methylsiloxane monomer, $R^2$ methylsiloxane monomer and $R^3$ methylsiloxane monomer is 1:1.2:2.2.

Example 4

Preparation of Siloxane Copolymer No. 4

In the siloxane copolymer No. 4, $R^1$ is —$(CH_2)_3$—COOH, $R^2$ is —$(CH_2)_3$—O—$(CH_2CH_2O)_n$—H, $R^3$ is —$OC_2H_5$ and the resulting siloxane copolymer is partially nonionic. Allylacetate, $CH_2$=$CHCH_2CO_2CH_3$ (Aldrich, Milwaukee, Wis.) and allyl-monotrimethylsiloxyl terminated polyethylene oxide were attached to the polysiloxane backbone in polymethylhydrosiloxane(Gelest Inc., Tullytown, Pa.) by the addition reaction procedure as described in Example 1. The protective group in $R^1$ was acetyl group and that in $R^2$ was trimethylsilane group. The free hydrogen atoms in the polymethylhydrosiloxane were converted into —$OC_2H_5$ groups in ethyl alcohol by $NaOC_2H_5$ at a pH of 8–9.

The approximate molar ratio for the $R^1$ methylsiloxane monomer, $R^2$ methylsiloxane monomer and $R^3$ methylsiloxane monomer is 3.2:1:4.2.

Example 5

Preparation of Siloxane Copolymer No. 5

In the siloxane copolymer No. 5, $R^1$ is —$(CH_2)_3COOH$, $R^2$ is α-galactose, $R^3$ is —$OCH_3$ and the resulting siloxane copolymer is partially nonionic. Allylacetate and α-allylgalactose were attached to the polysiloxane backbone of polymethylhydrosiloxane by the addition reaction procedure as described in Example 1. Prior to allylation the reactive hydrogen atoms in both $R^1$ and $R^2$ were protected by acetyl groups. The free hydrogen atoms in the polymethylhydrosiloxane were converted into —$OCH_3$ groups in methanol by $NaOCH_3$ at a pH of 8–9.

The approximate molar ratio for the $R^1$ methylsiloxane monomer, $R^2$ methylsiloxane monomer and $R^3$ methylsiloxane monomer is 2:1:1.

Comparative Example

A 1.0% aqueous solution of Akwadyne, available from Comfort Technologies, Inc., (Gaston, N.C.) was prepared. Akwadyne is understood to contain the polysiloxane agent as disclosed in the above mentioned Barringer patents. This solution was then used to treat a swatch of polyester fabric as set forth below. The treated fabric was then tested for wetting time and wicking time with the results tabulated in Table 1.

Modification of Synthetic Fabric with Multifunctional Siloxane Copolymer Polyester fabric swatches, roughly 1.5 inches by 1.1 inches, were treated with each of the siloxane copolymers and Akwadyne prepared above. The swatches were first scoured with soda ash, dried and then immersed in an 1.0% aqueous solution of the subject siloxane copolymer at about 85° C. for 25 minutes. The treated fabric was then dried at 100° C. for 10 minutes. This immersion treatment provides a fabric with about 1 to 5 wt. % of the siloxane copolymer, based on the weight of the fabric, being picked up by the fabric. After cooling to room temperature, the treated fabric was tested for both wetting time and wicking time.

The results of the wetting time and wicking time evaluations are set forth in Table 1.

TABLE 1

| | Wetting and Wicking Tests | |
|---|---|---|
| Samples | Wetting Time | Wicking Time |
| Control | 199 sec. | >60 sec./in. |
| Example No. 1 | 3 sec. | 16 sec./in. |
| Example No. 2 | 9 sec. | 17 sec./in. |

TABLE 1-continued

Wetting and Wicking Tests

| Samples | Wetting Time | Wicking Time |
|---|---|---|
| Example No. 3 | 5 sec. | 18 sec./in. |
| Example No. 4 | 3 sec. | 16 sec./in. |
| Example No. 5 | 7 sec. | 14 sec./in. |
| Akwadyne | 7 sec. | 24 sec./in. |

Laundry Tests

The fabric swatches were dried and then subjected to repeated launderings with and without detergent. The detergent utilized was AATCC standard reference detergent. Laundering was accomplished with an automatic washing machine and an automatic tumble dryer. Wetting time for the laundered fabrics was measured as set forth above. The results are tabulated in Table 2.

TABLE 2

Laundry Tests WETTING TIME (in seconds)

| SAMPLE | No. 1 | No. 2 | No. 3 | No. 4 | No. 5 | Akwadyne |
|---|---|---|---|---|---|---|
| Washed 15 times w/o detergent | 5 | 15 | 7 | 6 | 16 | 12 |
| Washed 50 times w/o detergent | 7 | 22 | 12 | 11 | 24 | 22 |
| Washed 1 time with detergent | 5 | 22 | 5 | 3 | 14 | 72 |
| Washed 2 times with detergent | 5 | 24 | 5 | 5 | 15 | >180 |
| Washed 5 times with detergent | 6 | 26 | 8 | 5 | 20 | >180 |
| Washed 15 times with detergent | 12 | 45 | 14 | 8 | 23 | — |
| Washed 25 times with detergent | 15 | 135 | 20 | 11 | 25 | — |
| Washed 50 times with detergent | 21 | 161 | 26 | 12 | 28 | — |

The foregoing detailed description of the preferred embodiments of the invention has been provided for the purposes of illustration and description. It is not intended to be exhaustive or to limit the invention to the precise embodiments disclosed. Many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A multifunctional siloxane copolymer for modifying synthetic materials comprised of polyamide, polyester, a combination thereof, or other materials containing carbonyl groups or amide groups, wherein the multifunctional siloxane copolymer is represented by the following compositional formula:

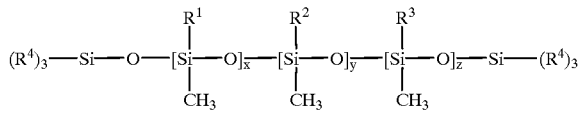

wherein $R^1$ comprises an anionic functional group, wherein $R^2$ comprises a nonionic functional group, wherein $R^3$ comprises at least one member selected from the group consisting of alkyl groups, phenyl groups and alkoxyl groups, wherein each $R^4$ independently comprises at least one member selected from the group consisting of alkyl groups, phenyl groups, alkoxyl groups, $R^1$ and $R^2$, wherein x, y and z are each a positive integer and represent the molar numbers of the siloxane units containing $R^1$, $R^2$, and $R^3$, respectively, in the siloxane copolymer, wherein the molar ratio x+y:z is about 1:1, wherein $R^1$, $R^2$, $R^3$ and $R^4$ can be the same or different independently, and wherein $R^1$ and $R^2$ are independently selected to provide binding ability of said siloxane copolymer to reactive functional groups in one or both of polyamide materials and polyester materials, and to provide a predetermined level of hydrophilicity, binding ability between said siloxane copolymer and the synthetic materials, and softening effect to synthetic materials subsequently treated with said multifunctional siloxane copolymer.

2. A multifunctional siloxane copolymer according to claim 1, wherein $R^1$ comprises deprotonated —$(CH_2)_3$—COOH, $R^2$ comprises —$(CH_2)_3$—O—$(CH_2CH_2O)_n$—H, $R^3$ comprises —$OC_2H_5$ and wherein x, y, and z are in an approximate 3.2:1:4.2 ratio.

3. A multifunctional siloxane copolymer according to claim 1, wherein $R^1$ comprises deprotonated —$(CH_2)_3COOH$, $R^2$ comprises —$CH_2CH_2CH_2$-α-galactose, $R^3$ comprises —$OCH_3$ and wherein x, y, and z are in a 1:1:2 ratio.

4. A multifunctional siloxane copolymer for modifying synthetic materials comprised of polyamide, polyester, a combination thereof, or other materials containing carbonyl groups or amide groups, wherein the multifunctional siloxane copolymer is represented by the following compositional formula:

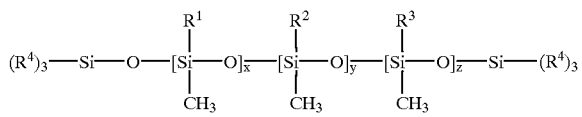

wherein $R^1$ comprises at least one member selected from the group consisting of —$CH_2CH_2CH_2$-linked nonionic carbohydrates, glucose-containing secondary amines, and alkylurea, wherein $R^2$ comprises at least one member selected from the group consisting of alcohols, epoxyalkyl groups, polyalkeneoxide carbinols, anionic carbinols, nonionic carbohydrates, and anionic carbohydrates, wherein $R^3$ comprises at least one member selected from the group consisting of alkyl groups, phenyl groups and alkoxyl groups, wherein each $R^4$ independently comprises at least one member selected from the group consisting of alkyl groups, phenyl groups, alkoxyl groups, $R^1$ and $R^2$, wherein x, y and z are each a positive integer and represent the molar numbers of the siloxane units containing $R^1$, $R^2$, and $R^3$, respectively, in the siloxane copolymer, wherein the molar ratio x+y:z is about 1:1, and wherein $R^1$ and $R^2$ are independently selected to provide binding ability of said siloxane copolymer to reactive functional groups in one or both of polyamide materials and polyester materials, and to provide a predetermined level of hydrophilicity, binding ability between said siloxane copolymer and the synthetic materials, and softening effect to synthetic materials subsequently treated with said multifunctional siloxane copolymer.

5. A multifunctional siloxane copolymer according to claim 4, wherein if $R^1$ comprises a nonionic functional group then $R^2$ comprises either a nonionic or anionic functional group.

6. A multifunctional siloxane copolymer according to claim 4, wherein the nonionic and anionic carbohydrates further comprise monosaccharides, modified monosaccharides, and low molecular weight polysaccharides.

7. A multifunctional siloxane copolymer according to claim 4, wherein $R^1$ comprises —$CH_2CH_2CH_2$-α-galactose, $R^1$ comprises —$(CH_2)_3$—O—$(CH_2CH_2O)_n$—H, $R^3$ comprises —$CH_3$ and wherein x, y, and z are in an approximate 3.3:1:4.3 ratio.

8. A multifunctional siloxane copolymer according to claim 4, wherein $R^1$ comprises —$(CH_2)_3$—N(H)—C(O)-Glucose, $R^2$ comprises —$(CH_2)_3$—O—$(CH_2CH_2O)_n$—H, $R^3$ comprises —$CH_3$ and wherein x, y, and z are in an approximate 3.3:1:4.3 ratio.

9. A multifunctional siloxane copolymer according to claim 4, wherein $R^1$ comprises —$(CH_2)_3$—$NHCONH_2$, $R^2$ comprises —$(CH_2)_3$—O )—$(CH_2CH_2O)_n$—H, $R^3$ comprises —$CH_3$ and wherein x, y, and z are in an approximate 1:1.2:2.2 ratio.

* * * * *

UNITED STATES PATENT AND TRADEMARK OFFICE
CERTIFICATE OF CORRECTION

PATENT NO. : 6,307,000 B1
DATED : October 23, 2001
INVENTOR(S) : Wong

It is certified that error appears in the above-identified patent and that said Letters Patent is hereby corrected as shown below:

<u>Title page,</u>
Item [76], Inventor, insert the following:
-- [73] Assignee: Gobal Wealth (BVI) Ltd., Tortula, British Virgin Islands --.

Signed and Sealed this

First Day of January, 2002

*Attest:*

JAMES E. ROGAN
*Attesting Officer*     *Director of the United States Patent and Trademark Office*